March 1, 1927.  T. E. CHARTER  1,619,287
HOSE REPAIR CLAMP
Filed Aug. 10, 1923   2 Sheets-Sheet 1
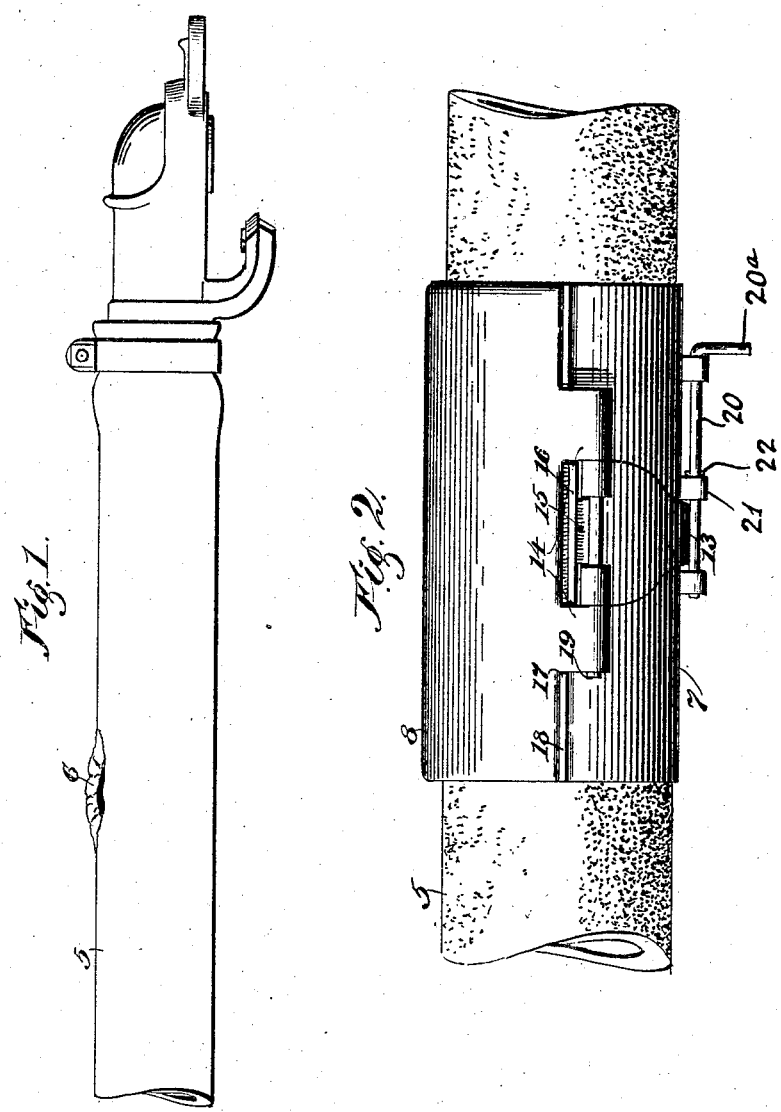

March 1, 1927. 1,619,287
T. E. CHARTER
HOSE REPAIR CLAMP
Filed Aug. 10, 1923 2 Sheets-Sheet 2
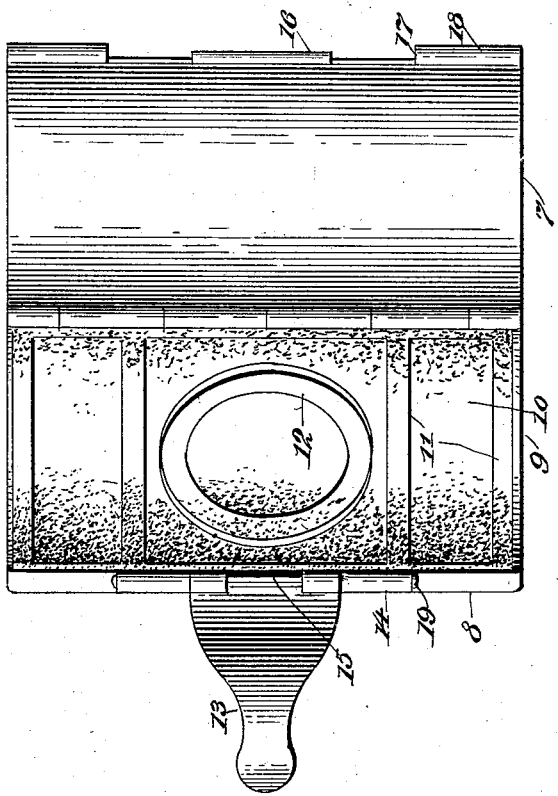
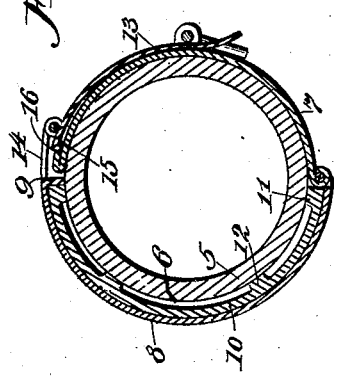

Patented Mar. 1, 1927.

1,619,287

UNITED STATES PATENT OFFICE.

THOMAS E. CHARTER, OF CEDAR RAPIDS, IOWA.

HOSE-REPAIR CLAMP.

Application filed August 10, 1923. Serial No. 656,705.

This invention relates to means for closing leaks in hose, more particularly train-pipe air-hose, when a blowout takes place, as is not infrequent.

The object of the invention is to provide a clamp which may be quickly applied to the defective hose, and will serve as a permanent air-tight closure against leakage.

Various means have been devised for this purpose, but so far as I am aware, none that do not require a considerable amount of time in applying to the hose, so as to close the leak. It is not uncommon for such accidents to cause serious delays to trains, not only to the one suffering the accident, but to connecting trains on branch lines whose movements depend on the disabled train. It is therefore of great importance that the hose be mended with the least possible delay.

The nature of the invention will clearly appear from the description and claims following, reference being had to the accompanying drawings, in which:

Fig. 1 is a side view of the coupling portion of the train-pipe air-hose in general use, showing a blowout in the upper side thereof. Fig. 2 is a side elevation of a piece of hose with my improved clamp applied thereto, as seen from the locking side thereof. Fig. 3 is a central cross-section of the same. Fig. 4 is a plan view of the clamp open, and showing the inner side thereof.

In the drawing the numeral 5 denotes a hose, which under internal pressure, or otherwise, has burst at 6. The device for closing the breach is described as follows:

Hinged at one side, a pair of semi-cylindrical clamp-plates are provided, fitting nicely over the hose, and adapted to be clasped thereon at the open side. One of these plates, 7 may fit the hose closely over its whole interior. The other, 8, is inwardly flanged at 9, so as to retain an inserted gasket 10 of suitable material, preferably rubber. The gasket is preferably ribbed at 11 and 12, such ribs admitting of the gasket being more easily pressed closely against the hose, to make an air-tight closure around the hole therein. A short lever 13 provides the necessary pressure, and serves as a secure lock for the halves of the clamp. The lever is shown hinged between a pair of lugs 14 projecting from the plate 8, its curved body lying close to the plate 7 when in locking position. The closing pressure and locking action are effected by the engagement of a short lip 15 of the lever and a shoulder 16 near the edge of the plate 7. By reference to Fig. 3 it will be evident that when in the locking position the clasp will hold without slipping, regardless of the internal pressure on the hose, an increase of which only serves to intensify the grip of the lock.

As will be evident from the drawing, the clamp is pressed out of sheet steel, which is sufficiently elastic to permit a little yielding of the tangential lugs 14 in the operation of the lever 13.

In applying the clamp to air-hose, which is sometimes in a rather difficult position to be reached conveniently, it is desirable to apply the clamp loosely to the hose, and then carefully adjust it to the proper position with respect to the blowout. This temporary latching of the parts is easily effected by pressing the shoulder 17 of the flange 18 past the slightly projecting stud 19, which as herein shown is the hinge-pin of the latch-lever. This catches enough to prevent the clamp from falling off the hose, but the catch is easily engaged or disengaged by the hands. The catch is of course useful in preventing the loss of the clamp in the event of the lock being disengaged by meddlesome tampering or otherwise.

In practice the clamp is so quickly attached that a break in the air-hose need cause no delay in running time, and once attached, the repaired hose serves as well as a new one.

To prevent the possibility of the latch-lever's working loose under vibration or a disengaging jar, provision is made for locking it in the closed position. A simple device for the purpose is a pin 20 slidable endwise in lugs 21, and operable by a short handle 20ª. A short cross-pin 22 prevents detachment of the locking-pin.

Having thus described my invention, I claim:

1. A hose repair clamp, comprising a pair of semi-cylindrical plates, one of them inwardly flanged to retain a gasket, a single-piece gasket fitting half of the clamp, and formed with ribs adapted to surround the break in the hose, and means adapted to hold the clamp-plates securely on the hose.

2. A hose repair clamp, comprising a pair of semi-cylindrical plates hinged together at one side, a gasket held by one of them to cover the break in the hose, elastic lugs extending tangentially from the free edge of one of the plates, a latch-lever hinged between them, and a shoulder near the edge of the other plate to be engaged by a short arm of the lever, the spring of the lugs permitting the lever to turn to locking position.

3. A hose repair clamp, comprising a pair of semi-cylindical plates hinged together, one of them having at the free side a pair of elastic, tangential lugs, and the other, near its edge, a lever-engaging shoulder, and a lever of substantially the same curvature as the clamp-plates hinged to said lugs, and having a shorter arm adapted to engage said shoulder, the spring of the lugs permitting the lever to turn to locking position, said lugs holding said lever close to the clamp-plates in said locking position.

4. A hose repair clamp, comprising a pair of hose-embracing plates hinged together, a latch-lever at the free side of the clamp, adapted to close and lock it on the hose, a projection on one of the plates and a fixed member on the other to engage said projection when pressed past it, whereby the clamp may be held frictionally in a partially open position.

In testimony whereof I affix my signature.

THOMAS E. CHARTER.